US010759278B2

(12) United States Patent
Speer et al.

(10) Patent No.: US 10,759,278 B2
(45) Date of Patent: Sep. 1, 2020

(54) DOWNHILL SPEED CONTROL TARGET ADAPTATION BASED ON ENGINE RETARDER DEMAND

(71) Applicant: PACCAR Inc, Bellevue, WA (US)

(72) Inventors: Jason Speer, Bellingham, WA (US); Joseph Wray Virden, Bellingham, WA (US)

(73) Assignee: PACCAR INC, Bellevue, WA (US)

( * ) Notice: Subject to any disclaimer, the term of this patent is extended or adjusted under 35 U.S.C. 154(b) by 66 days.

(21) Appl. No.: 16/121,319

(22) Filed: Sep. 4, 2018

(65) Prior Publication Data

US 2020/0070658 A1 Mar. 5, 2020

(51) Int. Cl.
*B60K 31/00* (2006.01)
*B60K 26/02* (2006.01)
*F02D 11/10* (2006.01)

(52) U.S. Cl.
CPC .............. *B60K 31/00* (2013.01); *B60K 26/02* (2013.01); *F02D 11/10* (2013.01); *B60K 2031/0091* (2013.01); *F02D 2200/501* (2013.01)

(58) Field of Classification Search
CPC .............................. B60K 31/00; B60K 26/02; B60K 2031/0091; F02D 11/10; F02D 2200/501
See application file for complete search history.

(56) References Cited

U.S. PATENT DOCUMENTS

| 6,299,263 B1 | 10/2001 | Uematsu et al. |
| 2005/0096183 A1 | 5/2005 | Watanabe et al. |
| 2009/0132142 A1* | 5/2009 | Nowak .............. B60K 31/0008 701/93 |
| 2011/0130938 A1 | 6/2011 | Seok |

(Continued)

FOREIGN PATENT DOCUMENTS

| WO | 2015/197092 A1 | 12/2015 |
| WO | 2017/036492 A1 | 3/2017 |

OTHER PUBLICATIONS

"Driver Technique," ISX Engine Brake Driver Technique, Cummins Engines, <https://cumminsengines.com/powerspec-isx-engine-brake-driver-technique> [retrieved Jun. 15, 2018], 2 pages.

(Continued)

*Primary Examiner* — Rodney A Butler

(57) ABSTRACT

A vehicle computer system controls downhill speed of a vehicle having a cruise control and an engine retarder. The system receives a request to increase engine retarder demand. In response, the system increases an engine retarder demand setting and, if cruise control is active, decreases a downhill speed control (DSC) cruise control offset. The engine retarder system may automatically activate to reduce the vehicle speed to a cruise control set speed plus the DSC cruise control offset. In an embodiment, the request to increase engine retarder demand is generated in response to operator input via an engine retarder demand input device (e.g., a steering-column-mounted control stalk). The system may also receive a request to decrease engine retarder (Continued)

demand in the engine retarder of the vehicle. In response, the system decreases the engine retarder demand setting and, if cruise control is active, increases the DSC cruise control offset.

20 Claims, 6 Drawing Sheets

(56) References Cited

U.S. PATENT DOCUMENTS

| | | | | |
|---|---|---|---|---|
| 2012/0205169 A1* | 8/2012 | Montocchio | ............ | B60T 10/02 180/54.1 |
| 2016/0082960 A1* | 3/2016 | Slaton | ................. | B60W 30/143 701/93 |
| 2018/0222456 A1* | 8/2018 | Lin | ......................... | B60T 8/172 |
| 2018/0244269 A1* | 8/2018 | Carlsson | ................... | B60T 7/12 |

OTHER PUBLICATIONS

"Fact Sheet: Engine Brake Type EBR-EPG," Document No. 2015-03-09 ENG Version 02, Volvo Truck Corporation, 2 pages.

"Fact Sheet: Retarder RED-TH," Document No. ENG 2014-03-10 Version 06, Volvo Truck Corporation, 2 pages.

Howard, J., "Putting Paccar's New Automated Transmission to the Test," Transport Topics, Aug. 24, 2017, <http://www.ttnews.com/articles/putting-paccars-new-automated-transmission-test> [retrieved Jun. 15, 2018], 2 pages.

Persson, M., and A. Hedberg, "Electrical and Spring Returning Stalks for Truck Applications: User Evaluation and Concept Development of Steering Wheel Stalks," Master's Thesis, Umeå University, Gothenburg, Sweden, Feb. 2007, 98 pages.

Extended European Search Report in Application 19195299.3, dated Feb. 28, 2020, 7 pages.

\* cited by examiner

DOWNHILL SPEED CONTROL TARGET ADAPTATION BASED ON ENGINE RETARDER DEMAND

BACKGROUND

In vehicles with downhill speed control systems, a cruise control offset may be provided when downhill speed control is active. This allows the vehicle speed to exceed the cruise control set speed by the specified offset amount on a downhill grade. An engine retarder system may be used in such vehicles to automatically apply retarding force to modulate vehicle speed in an attempt to stay within the fixed cruise control offset while the downhill speed control system is active.

Separately, the operator also may be provided with the ability to manually adjust an engine retarder demand setting to select a desired level of auxiliary braking. An increase in engine retarder demand typically leads to decreased vehicle speed as engine retarder torque increases. This provides an additional level of control for the operator.

However, in vehicles with downhill speed control systems, the vehicle does not react to an operator's manual adjustment to engine retarder demand while the downhill speed control system is active. Although it is possible to provide a separate input device, such as a button or switch, to manually adjust downhill speed offsets, this adds complexity for the operator and reduces the amount of usable space for operator controls in the cab of the vehicle.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a vehicle computer system controls downhill speed of a vehicle having an engine retarder system and an operator interface. The system receives, via an engine retarder demand input device of the operator interface, a request to increase engine retarder demand. In response to the request, the system increases an engine retarder demand setting and decreases (e.g., according to a predetermined slew rate) an auto-retarder set speed for the vehicle. The auto-retarder set speed indicates a vehicle speed at which the engine retarder system automatically activates to reduce the vehicle speed to the auto-retarder set speed. The input device may include a switch or a control stalk (e.g., a steering-column-mounted control stalk). In an embodiment, the operator input may include moving a steering-column-mounted control stalk back and forth, up and down, or some other input such pressing a button or rotating a knob on the control stalk. The system may also receive, via the input device, a request to decrease engine retarder demand in the engine retarder system of the vehicle. In response to the request to decrease engine retarder demand, the system may decrease the engine retarder demand setting and increase (e.g., according to a predetermined slew rate) the auto-retarder set speed for the vehicle. The auto-retarder set speed may be calculated by adding a downhill speed control (DSC) cruise control offset to a cruise control set speed for the vehicle.

In another aspect, a vehicle computer system controls downhill speed of a vehicle having a cruise control system and an engine retarder system. The system receives a request to increase engine retarder demand. In response to the request, the system increases an engine retarder demand setting and, if cruise control is active, decreases a DSC cruise control offset for the vehicle. The engine retarder system may automatically activate to reduce the vehicle speed to a cruise control set speed plus the DSC cruise control offset. In an embodiment, the request to increase engine retarder demand is generated in response to operator input via an engine retarder demand input device of an operator interface of the vehicle. The system may also receive a request to decrease engine retarder demand in the engine retarder system of the vehicle. In response, the system decreases the engine retarder demand setting and, if cruise control is active, increases the DSC cruise control offset for the vehicle.

Suitably configured vehicles and computer systems are also described. In any of the described embodiments, the vehicle computer system may be an on-board vehicle computer system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
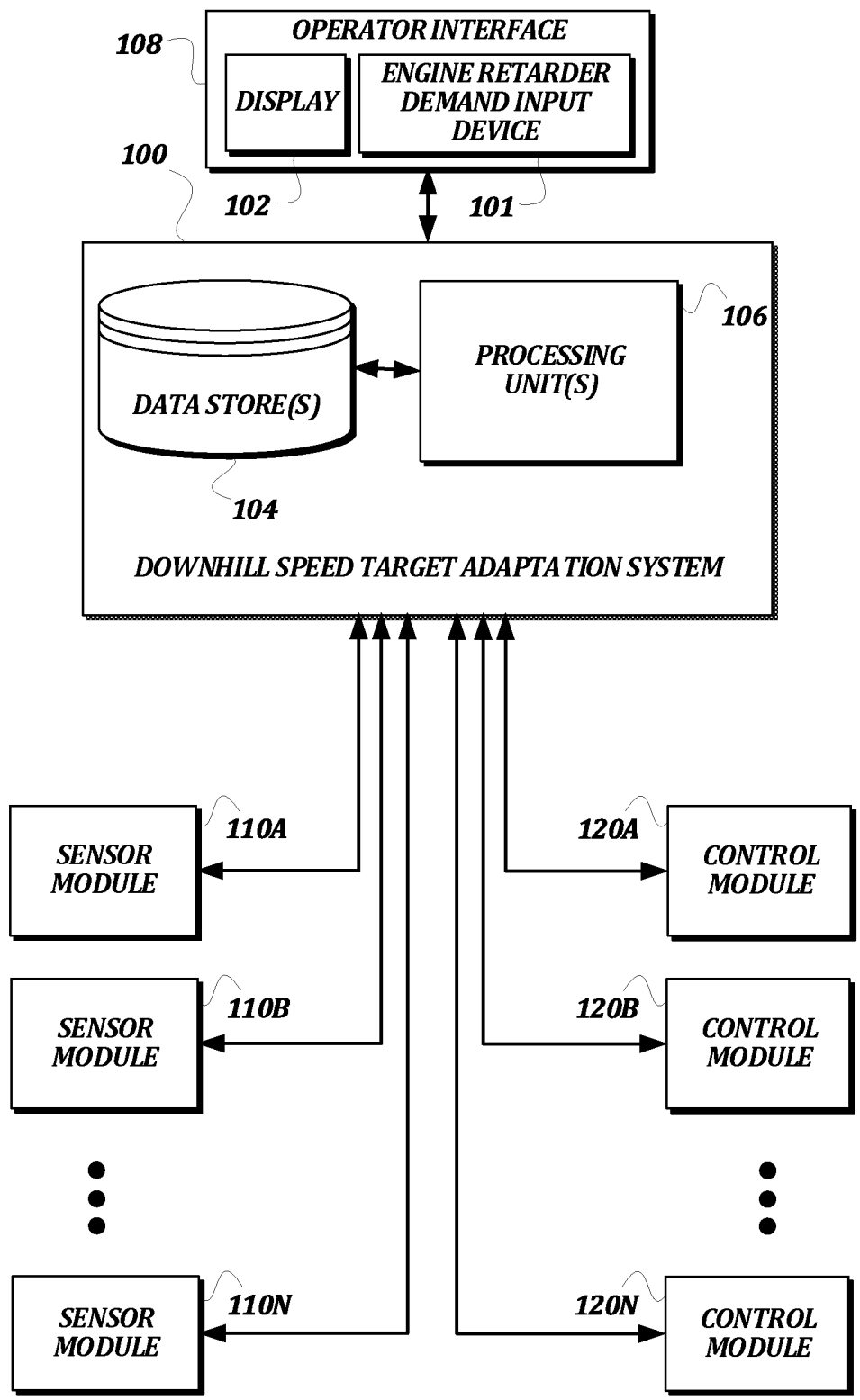
FIG. 1 is a system diagram that illustrates an embodiment of a vehicle computer system including a downhill speed target adaptation system according to various aspects of the present disclosure.

The detailed description set forth below in connection with the appended drawings is an illustrative and non-limiting description of various embodiments of the disclosed subject matter. The following description proceeds with reference to examples of systems and methods suitable for use in vehicles, such as Class 8 trucks. Although illustrative embodiments of the present disclosure will be described hereinafter with reference to trucks, it will be appreciated that aspects of the present disclosure have wide application, and therefore, may be suitable for use with many types of vehicles, such as passenger vehicles, buses, commercial vehicles, light and medium duty vehicles, etc.

Embodiments described herein provide advantages over prior systems, which have typically required a complex array of input devices and operator interactions to provide downhill speed control and auxiliary braking functionality. For example, in prior vehicles with downhill speed control systems, a fixed cruise control offset is provided when downhill speed control is active. An engine retarder system may be used in such vehicles to automatically apply retarding force to modulate vehicle speed in an attempt to stay within the fixed cruise control offset while the downhill speed control system is active. The operator also may be provided with the ability to manually adjust an engine retarder demand setting to select a desired level of auxiliary braking. An increase in engine retarder demand typically leads to decreased vehicle speed as engine retarder torque increases.

However, in vehicles with downhill speed control systems, the vehicle does not react to an operator's manual adjustment to engine retarder demand while the downhill speed control system is active. Although it is possible to provide a separate input device, such as a button or switch, to manually adjust downhill speed offsets, this adds complexity for the operator and reduces the amount of usable space for operator controls in the vehicle. For example, an operator may be required to activate cruise control using a first input device and interaction, adjust auxiliary braking systems or engine retarder demand using at least a second input device and interaction, and adjust a downhill speed setting using at least a third input device and interaction. Each of these steps requires the operator to locate the appropriate input device and recall and execute the appropriate interaction with that device in order to achieve the desired result. This can be very cumbersome and distracting for the operator. Omitting one or more of these steps and relying more heavily on service (foundation) brakes to control downhill speed can lead to overheating and brake wear.

Furthermore, every input device that is accessible to an operator occupies some of the limited space on the dashboard or steering column. Thus, an arrangement that requires separate input devices for adjusting downhill speed control settings and controlling auxiliary braking will leave less space for other devices that may be necessary or desirable, in addition to creating a more complex operating environment that can be distracting to the operator.

Described embodiments address one or more of these problems by providing the operator with the ability to efficiently control downhill speed of the vehicle while preserving valuable dashboard or steering column space and limiting the risk of operator distraction from ever increasing numbers of input devices. In described embodiments, the operator of a vehicle (e.g., a heavy duty truck) is provided with the ability to effectively and intuitively control downhill speed based on an engine retarder setting (e.g., via an engine retarder switch, dial, or steering column-mounted control stalk). This additional aspect of downhill speed control is provided to the operator without any additional input devices or interactions beyond what is needed to control the engine retarder setting. In this way, additional functionality is provided to the operator in an intuitive manner so as to minimize operator distractions and preserve valuable dashboard or steering column space. As an additional potential benefit, the operator is able to adjust vehicle speed by adjusting the engine retarder setting not only when downhill speed control is inactive, but when it is active, as well. This may provide a more intuitive measure of control for the operator.

It is also anticipated that some operator interface designs may replace one or more input devices, such as buttons or steering-column-mounted control stalks, with corresponding virtualized user interface features (e.g., using voice commands or using touch input to manipulate graphical user interface (GUI) elements on a touchscreen). Yet similar benefits may still be achieved in such a scenario, as the operator may still employ a single interaction to adjust engine retarder demand and a downhill speed offset, which can reduce operator distraction and preserve valuable GUI space by avoiding the need for separate controls for adjusting downhill speed targets and engine retarder demand.

It should be understood that various embodiments of the present disclosure include logic and operations performed by electronic components. These electronic components, which may be grouped in a single location or distributed over a wide area, generally include processors, memory, storage devices, display devices, input devices, etc. It will be appreciated by one skilled in the art that the logic described herein may be implemented in a variety of hardware, software, and combination hardware/software configurations, including but not limited to, analog circuitry, digital circuitry, processing units, and the like. In circumstances where the components are distributed, the components are accessible to each other via communication links. Components described herein may be communicatively coupled by any suitable means. In one embodiment, components are connected by an internal communications network such as a vehicle bus that uses a controller area network (CAN) protocol, a local interconnect network (LIN) protocol, and/or the like. Those of ordinary skill in the art will recognize that the vehicle bus may be implemented using any number of different communication protocols such as, but not limited to, Society of Automotive Engineers (SAE) J1587, SAE J1922, SAE J1939, SAE J1708, and combinations thereof. In other embodiments, components may be connected by other networking protocols, such as Ethernet, Bluetooth, TCP/IP, and/or the like. In still other embodiments, components may be directly connected to each other without the use of a vehicle bus, such as by direct wired connections between the components. Embodiments of the present disclosure may be implemented using other types of currently existing or yet-to-be-developed communication systems without departing from the scope of the claimed subject matter.

FIG. 1 is a system diagram that illustrates one embodiment of a vehicle computer system including a downhill speed target adaptation system 100 according to various aspects of the present disclosure. In the example shown in FIG. 1, the system 100 includes one or more processing units 106 (e.g., electronic control units (ECUs)) that analyze system settings, vehicle conditions, and operator input to calculate an adjustable downhill speed target for the vehicle. The system 100 communicates with an operator interface 108 comprising an engine retarder demand input device 101, such as a button, switch, or control stalk. Illustrative input devices and uses thereof are described in further detail below.

The operator interface 108 also may include a display 102. The display 102 may be any type of display (e.g., an LCD display) used in a vehicle to convey information, such as cruise control interlock notifications or other information related to the operator, the vehicle, or its environment. The operator display 102 may include special purpose lighted displays, needle gauges, and/or the like. The operator interface 108 also may include other output devices such as speakers or haptic feedback devices to provide information to the operator. In a touchscreen configuration, the operator display 102 may have input capabilities. The operator interface 108 also may include other input devices including buttons, toggles, keyboards, mechanical levers, and any other devices that allow an operator to provide input to the system 100 or other systems of the vehicle.

It will be appreciated that the processing units 106 can be implemented in a variety of hardware, software, and combination hardware/software configurations, for carrying out aspects of the present disclosure. The processing units 106 may include memory and a processor. In one embodiment, the memory comprises a random access memory ("RAM") and an electronically erasable, programmable, read-only memory ("EEPROM") or other non-volatile memory (e.g., flash memory) or persistent storage. The RAM may be a volatile form of memory for storing program instructions that are accessible by the processor. The processor is configured to operate in accordance with program instructions. The memory may include program modules, applications, instructions, and/or the like that are executable by the processor. The memory may include program instructions that implement functionality of the system 100. Alternatively, such instructions may be stored in other storage or in other locations.

The processing units 106 are communicatively coupled to one or more data stores 104, which may include data such as vehicle operation data and system configuration data, such as cruise control, downhill speed control or engine retarder system settings. The data store 104 includes a computer-readable storage medium. The data is used by the system 100, as described herein, to perform one or more of the functions described herein. For example, the description makes reference to vehicle data that can be sensed and stored during vehicle operation, as well as programmable settings that can be programmed by the vehicle manufacturer, the owner, the operator, or any other suitable entity. Any suitable computer-readable media, including non-transitory storage media such as an EEPROM, flash memory, hard disk, or the like, may be used to store executable instructions to implement systems and methods described herein.

In the example shown in FIG. 1, the system 100 is communicatively coupled to a plurality of sensors 110A-110N that provide information concerning the status of the vehicle. For example, the system 100 may be communicatively coupled to a vehicle speed sensor module, an engine speed sensor module, or other sensor modules. The sensor modules described herein are only examples, and the present disclosure is not limited the specific sensor modules described herein.

The system 100 is also communicatively coupled to a plurality of vehicle performance control modules 120A-120N for controlling various functions of the vehicle. For example, the system 100 may be communicatively coupled to modules that electronically control vehicle speed, engine speed, or other more specialized functions such as cruise control. In described embodiments, the control modules include an engine retarder system control module for controlling an engine retarder system and a downhill speed control module for controlling a downhill speed control system that operates in combination with or separately from a cruise control system. The engine retarder system may include one or more auxiliary braking systems such as compression brakes, exhaust brakes, electromagnetic driveline retarders, or hydraulic retarders. The vehicle performance control modules may be implemented, for example, in ECUs or in other computing devices or control circuitry. The vehicle performance control modules described herein are only examples, and the present disclosure is not limited to the specific vehicle performance control modules described herein.

The system 100 may be implemented in an on-board vehicle computer system or in some other configuration. Although some examples described herein relate to on-board vehicle computer systems, such examples may be extended to involve computer systems that are not on board a vehicle. For example, a suitably equipped vehicle may communicate with other computer systems wirelessly, e.g., via a WiFi or cellular network. Such systems may provide remote data processing and storage services, remote diagnostics services, operator training or assistance, or other services. In such an embodiment, the system 100 may be implemented in one or more computing devices that communicate with but are separate from, and potentially at a great distance from the vehicle.

Figure 2:
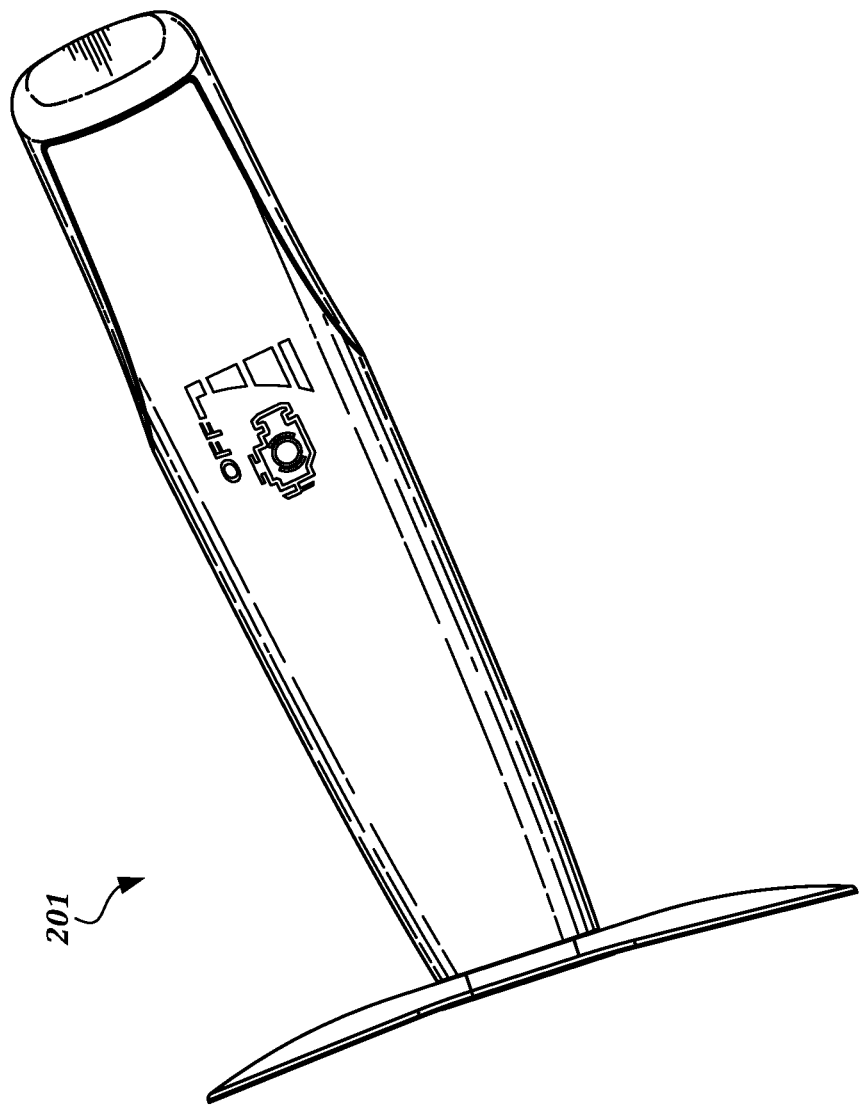
FIG. 2 is an illustration of an illustrative engine retarder demand input device that may be used with a downhill speed target adaptation system according to various aspects of the present disclosure.

FIG. 2 is an illustration of an illustrative engine retarder demand input device that may be used in accordance with various aspects of the present disclosure. In this example, the input device is implemented as a steering-column-mounted control stalk 201. In an illustrative scenario, the vehicle operator moves the control stalk up or down to adjust an engine retarder demand setting. The demand setting may be selected from among a plurality of possible settings (e.g., three or more). As shown, the highest position of the control stalk resets or turns the engine retarder off (0% demand), and the lower positions provide increasing levels of engine retarder demand (e.g., 33%, 66%, 100%) for a desired level of auxiliary braking. Although the control stalk 201 is illustrated as controlling only auxiliary braking functionality, it should be understood that the control stalk may also include components (e.g., buttons or dials) for controlling other functionality, such as gear selection for an automatic transmission. To avoid an unexpected deactivation of downhill speed control functionality, the ability of an operator to turn the engine retarder system off (e.g., manually, via an input device) may be prevented while downhill speed control is active. Alternatively, other movements of the control stalk, such as back and forth movements, or other input devices such as dials, switches, buttons, or virtualized input devices can be used to provide the illustrated levels of engine retarder demand, or coarser or finer levels of control.

Figure 3:
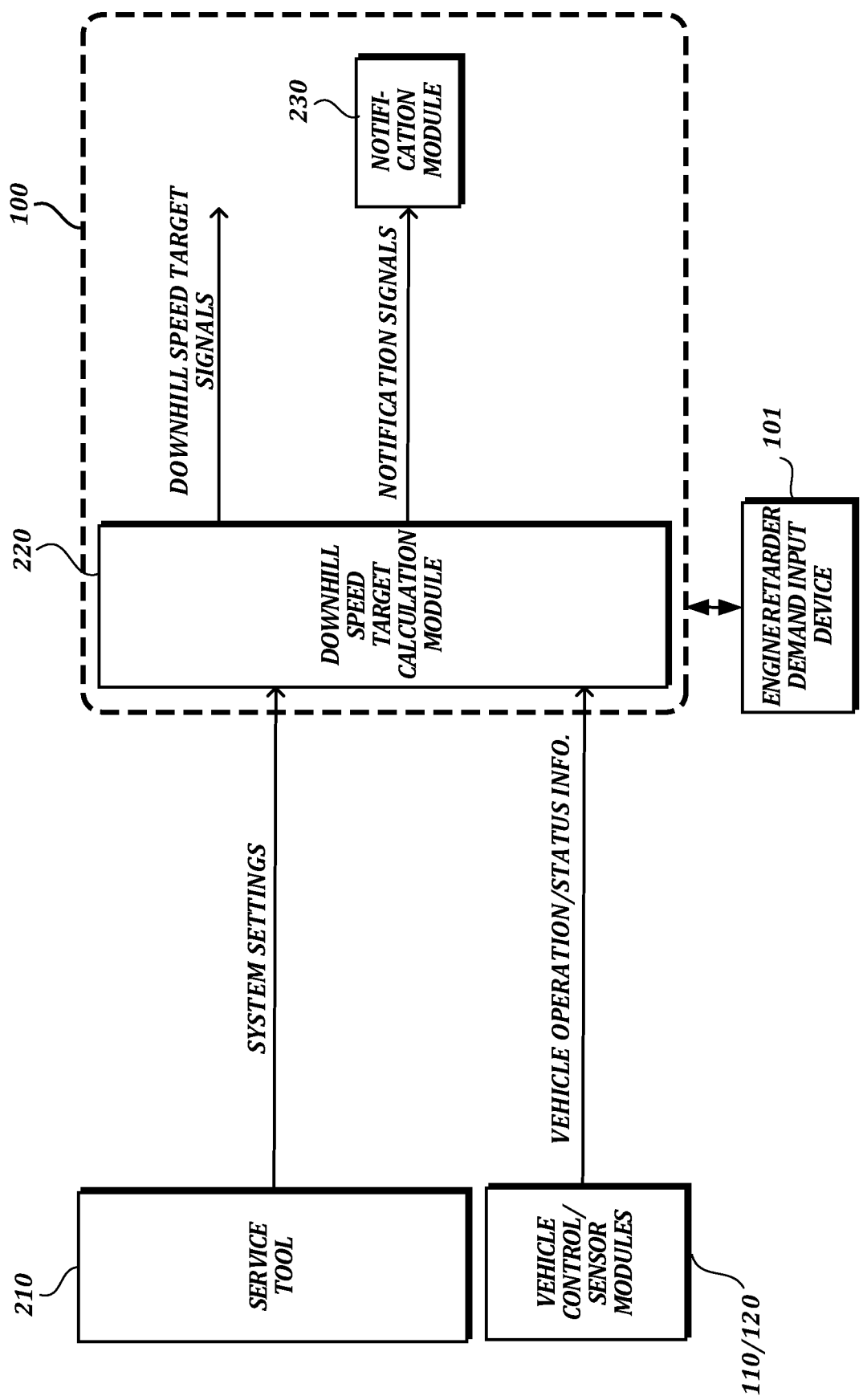
FIG. 3 is a system diagram that illustrates another embodiment of a vehicle computer system including a downhill speed target adaptation system according to various aspects of the present disclosure.

FIG. 3 is a system diagram of an embodiment of a downhill speed target adaptation system 100. In the example shown in FIG. 3, the system 100 includes a downhill speed target calculation module 220 and an optional notification module 230. The downhill speed target calculation module 220 and notification module 230 may be implemented in one or more ECUs or other processing units.

In this example, the system 100 receives signals corresponding to operator input from an engine retarder demand input device along with signals that provide system settings and vehicle operation and status information. Signals corresponding to operator input include, e.g., engine retarder demand settings (e.g., 100%, 66%, 50%, 33%, etc.). System settings provided to the system 100 may include, e.g., downhill speed control offset values that correspond to particular engine retarder demand levels, slew rates (rates of change) for increasing or decreasing a current downhill speed target to a new target over time, or other settings. Vehicle operation and status information provided to the system 100 include information that may be relevant to downhill speed control targets, such as downhill speed control system status (e.g., active or inactive), cruise control system status (e.g., active or inactive), or cruise control set speed values (e.g., 50 mph, 60 mph, etc.).

System settings may be received from a service tool 210. The service tool 210 may connect to an on-board vehicle computer system via the CAN bus. Alternatively, system settings can be provided in some other way or by some other device, such as on-board storage a remote computer communicating wirelessly with the system 100. Vehicle operation and status information may be provided by vehicle control modules 120 (e.g., cruise control modules, downhill speed control modules, etc.), vehicle sensor modules 110, data stores, or other sources or combinations of sources. Vehicle operation information, status information, and system settings may be stored in one or more data stores, such as data stores within the downhill speed target calculation module 220 or elsewhere within or outside of the system 100.

The system 100 also generates signals. In the example shown in FIG. 3, the downhill speed target calculation module 220 provides downhill speed target signals, such as an offset value to be added to a cruise control set speed to arrive at a new downhill speed target. Signals generated by the downhill speed target calculation module 220 can be provided, for example, as control signals to the cruise control system or a downhill speed control system that includes an engine retarder system.

Figure 6:
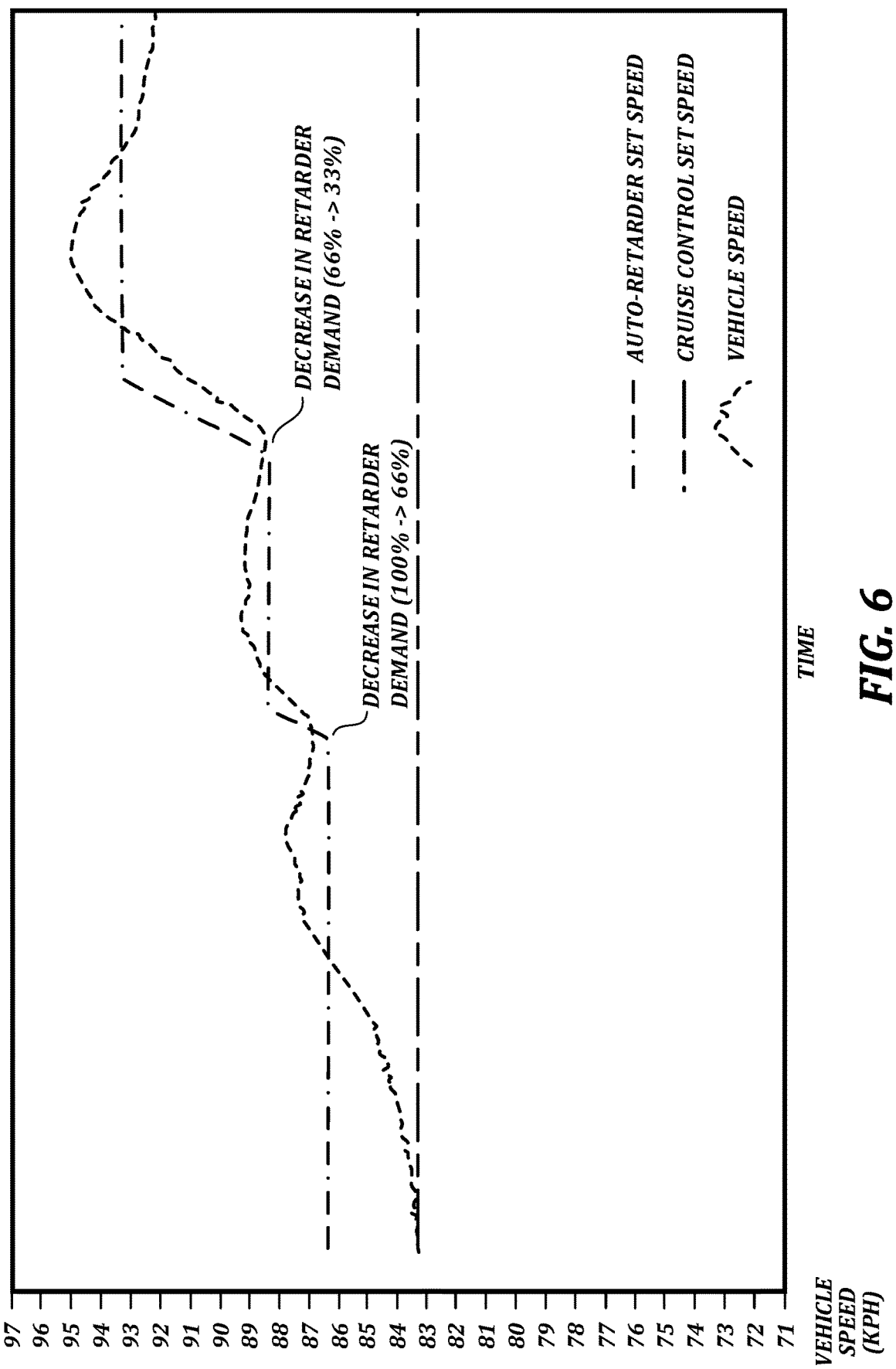
FIG. 6 is a graph that depicts changes of an auto-retarder set speed in response to changes in engine retarder demand according to various aspects of the present disclosure.

In an embodiment, the new downhill speed target indicates a vehicle speed at which the engine retarder system automatically activates to reduce the vehicle speed back to the downhill speed target. In this configuration, the engine retarder system can be referred to as an auto-retarder system, and the downhill speed target can be referred to as auto-retarder set speed. However, an auto-retarder system need not be fully automatic and may have adjustable or manual control aspects as described herein. An illustrative relationship of vehicle speed, adjustable auto-retarder set speeds, and a cruise control set speed is depicted in FIG. 6, which is described in further detail below.

In an illustrative scenario, operator input is provided via an engine retarder demand input device 101 such as the steering-column-mounted control stalk 201 depicted in FIG. 2. The downhill speed target calculation module 220 receives a signal indicating the position of the control stalk 201 and uses this value to look up a corresponding engine retarder demand setting in a lookup table that maps downhill speed control offset values to corresponding engine retarder demand settings. In an embodiment, the offset values have a linear relationship to the engine retarder demand setting, with higher demand settings resulting in lower offset values. In this way, higher demand settings will cause the engine retarder system to activate at lower vehicle speeds, while lower demand settings will cause the engine retarder system to activate at higher vehicle speeds. A slew rate can be used to adjust the offset value gradually over a period of time. This can help to avoid sudden deactivations of the engine retarder system that may otherwise occur if the offset value is increased all at once.

The downhill speed control offset value may depend only on the engine retarder demand setting, such as 1 mph for 100% demand, 2 mph for 66% demand, and 3 mph for 33% demand. Alternatively, the offset value may also vary based on other factors, such as the current vehicle speed or cruise control set speed. For example, the offset value for 100% demand at a cruise control set speed of 60 mph may be 2 mph, whereas the offset value for 100% demand at a cruise control set speed of 50 mph may be 1 mph. These offset values and corresponding mappings to engine retarder demand settings are only examples. Other values and mappings also may be used. In addition, although initial values and mappings may be provided as default settings, the values and mappings also may be modified, e.g., by a vehicle owner or operator, to adjust for factors such as owner or operator preferences, or the nature of the terrain (e.g., severity of downhill grades) over which a truck is traveling or is expected to travel in the future.

The system 100 is capable of working in the background without providing notifications to the operator. However, if information or feedback is desired about adjustments to downhill speed targets or other functionality, the system may transmit notification signals to the optional notification module 230. Signals generated by the system 100 may indicate whether notifications are to be presented via the operator interface 108 to, e.g., alert the operator that a new downhill speed target has been set in response to an adjustment to an engine retarder demand setting.

Notifications may take the form of visual cues such as diagrams, text, icons, and the like to communicate truck status, suggested actions, and other information. In any of the examples described herein, the content, appearance, or presence of notifications or other features of an operator interface may depend on operator or owner preferences, system settings, or other factors. Visual and functional elements may include any elements that are suitable for communicating the information described in these examples, or other information that may be relevant to the techniques and systems described herein. Notifications can be presented in different ways (e.g., in different colors, sizes, or display locations; animated or static; flashing or not flashing; flashing at different rates; with or without sound; movable on a screen or in a fixed location; etc.). Depending on implementation, one or more visual elements may be activated (e.g., by touch in a touch-enabled interface) to access additional information or functionality. Notifications may be displayed for a defined period of time or until a particular event occurs. As an example, a notification of a new downhill speed control offset may be displayed for a defined period of time (e.g., a few seconds) or until the downhill speed control offset changes or downhill speed control is no longer active.

Illustrative Methods

In this section, illustrative cruise control interlock methods are described that may be performed by a vehicle computer system described above or by some other system, in accordance with aspects of the present disclosure. Although illustrative details are provided in this section, it should be understood that alternative methods can be implemented and used in accordance with the present disclosure.

Figure 4:
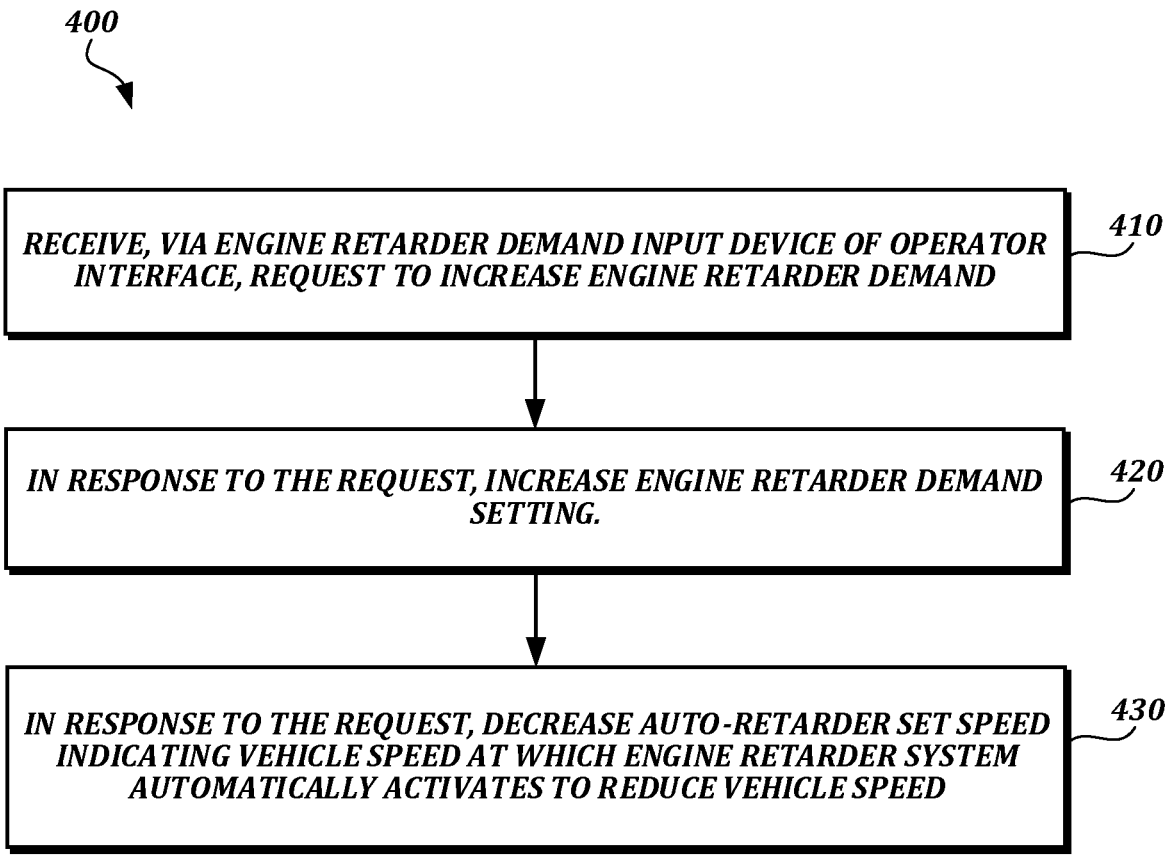
FIGS. 4 and 5 are flow diagrams of illustrative downhill speed target adaptation methods according to various aspects of the present disclosure.

FIG. 4 is a flow diagram of an illustrative downhill speed control target adaptation method 400. At step 410, the vehicle computer system receives, via an engine retarder demand input device of an operator interface, a request to increase engine retarder demand. In an embodiment, the input device is a steering-column-mounted control stalk, and the request is generated via manipulation of the steering-column-mounted control stalk by the operator, such as by moving the control stalk up or down to select the desired setting. At step 420, in response to the request, the system increases an engine retarder demand setting. In an embodiment, the engine retarder demand setting is selected from a group consisting of three or more demand settings such as 0%, 50%, and 100%, or 0%, 33%, 66%, and 100%, though other settings to provide different levels or precision of control are also possible. At step 430, also in response to the request, the system decreases (e.g., according to a predetermined slew rate) an auto-retarder set speed. The auto-retarder set speed indicates a vehicle speed at which the engine retarder system automatically activates to reduce or maintain vehicle speed. The system can use a similar approach for increasing the auto-retarder set speed. In an embodiment, the system receives, via the input device, a request to decrease engine retarder demand. In response, the system decreases the engine retarder demand setting and increases (e.g., according to a predetermined slew rate) the auto-retarder set speed for the vehicle.

In an illustrative scenario, the engine retarder system initially reduces the rate of downhill acceleration and then reduces vehicle speed back to or below the auto-retarder set speed. The engine retarder system then modulates the amount of retarding force to maintain the vehicle speed at, or slightly above or below (e.g., within 1 mph), the newly decreased auto-retarder set speed. In an embodiment, the auto-retarder set speed is calculated by adding a downhill speed control (DSC) cruise control offset to a cruise control set speed for the vehicle. Alternatively, such as where downhill speed control is not linked directly to cruise control, the system can use a different method to determine the auto-retarder set speed.

Figure 5:
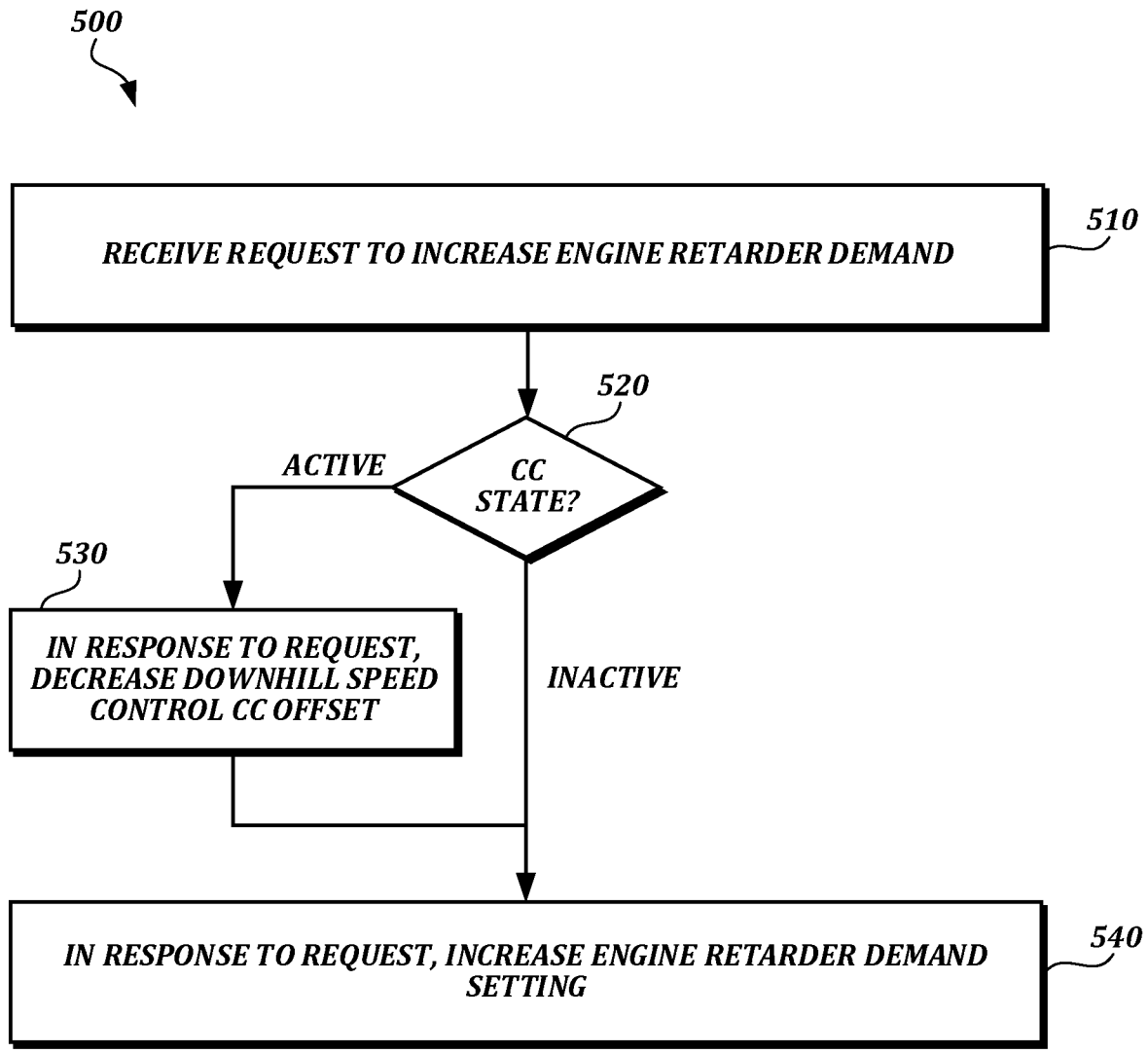

FIG. 5 is a flow diagram of another illustrative downhill speed control target adaptation method 500. In this example, the downhill speed control system is linked to the cruise control system. At step 510, the vehicle computer system receives a request to increase engine retarder demand. In an embodiment, the request to increase engine retarder demand is generated in response to operator input via an engine retarder demand input device (e.g., a steering-column-mounted control stalk) of an operator interface of the vehicle. At step 520, the system determines whether cruise control is active or inactive. If cruise control is active, in response to the request, the system decreases a downhill speed control cruise control offset at step 530 and also increases an engine retarder demand setting at step 540. If cruise control is not active, the downhill speed control system also will not be active. Therefore, the system does not decrease the downhill speed control offset and proceeds to step 540. The system can use a similar approach for increasing the downhill speed control offset. In an embodiment, when the system receives a request to decrease engine retarder demand, the system decreases the engine retarder demand setting and, if cruise control is active, increases the downhill speed control offset.

In an illustrative scenario, the system calculates a new downhill speed target by adding the adjusted downhill speed control offset to the current cruise control set speed. When the vehicle speed exceeds the new downhill speed target, the engine retarder system initially reduces the rate of downhill acceleration and then continues to apply retarding force to reduce vehicle speed back to, or slightly above or below, the new downhill speed target. The engine retarder system then modulates the amount of retarding force to maintain the vehicle speed at, or slightly above or below, the new downhill speed target. Alternatively, the system can use a different method to determine the new downhill speed target.

FIG. 6 is a graph that depicts changes of an auto-retarder set speed in response to changes in engine retarder demand according to various aspects of the present disclosure. In this example, a vehicle traveling downhill has a current cruise control set speed of approximately 83 km per hour (kph) and an initial engine retarder demand setting of 100%. This initial setting maps to a cruise control offset of 3 kph and a first auto-retarder set speed of approximately 86 kph. As the vehicle travels downhill, the vehicle speed increases to exceed the first auto-retarder set speed. At this point, the auto-retarder function becomes active and begins to reduce the vehicle speed back to the first auto-retarder set speed. At the first "Decrease in Retarder Demand" point, the operator reduces engine retarder demand (e.g., by changing a control stalk from a 100% position to a 66% position). In response, the downhill speed target adaptation system 100 selects a new offset of 5 kph and slews up to a second auto-retarder set speed of approximately 88 kph. The vehicle speed again increases to exceed the second auto-retarder set speed. At this point, the auto-retarder function again begins to reduce the vehicle speed back to the second auto-retarder set speed. At the second "Decrease in Retarder Demand" point, the operator reduces engine retarder demand (e.g., by changing a control stalk from a 66% position to a 33% position). In response, the downhill speed target adaptation system 100 selects a new offset of 10 kph and slews up to a third auto-retarder set speed of approximately 93 kph. The vehicle speed again increases to exceed the third auto-retarder set speed. At this point, the auto-retarder function again begins to reduce the vehicle speed back to the third auto-retarder set speed. In this process, the auto-retarder function remains enabled but engine retarder torque is applied selectively depending on whether the current vehicle speed exceeds the current auto-retarder set speed.

EXTENSIONS AND ALTERNATIVES

Many alternatives to the described methods are possible. For example, processing stages in the various methods can be separated into additional stages or combined into fewer stages. Processing stages in the various methods also can be omitted or supplemented with other methods or processing stages. Furthermore, processing stages that are described as occurring in a particular order can instead occur in a different order and/or in a parallel fashion, with multiple components or software processes concurrently handling one or more of the illustrated processing stages. As another example, processing stages that are indicated as being performed by a particular device or module may instead be performed by one or more other devices or modules.

Many alternatives to the vehicles and systems described herein are possible. Although illustrative details of operator interfaces and vehicle computing systems are described with reference to FIGS. 1, 2, and 3, it should be understood that alternative devices, systems, and methods can be implemented and used in accordance with the present disclosure. Further, it should be understood that, in practice, a fully-functional vehicle computer system may have additional components (e.g., sensors, control modules, output devices, input devices, and the like) or interface devices that are not shown in FIGS. 1, 2, and 3 for ease of illustration.

The particular signals, variables, and parameters described herein, as well as their respective possible ranges and states and the particular logic for processing them, are only examples. Depending on implementation, more or fewer or different signals, variables, and parameters may be used to achieve similar results. In any of the examples described herein, the specific signals, variables, and parameters that are described can be separated into additional signals, variables, or parameters, or combined into fewer signals, variables, or parameters.

It should be understood that aspects of the systems and related processes described herein transcend any particular type of vehicle and may be applied to vehicles employing an internal combustion engine (e.g., gas, diesel, etc.), hybrid drive train, or electric motor.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by The embodiments of the invention in which an exclusive property or privilege is claimed are defined as follows:

1. A computer-implemented method of controlling downhill speed of a vehicle having an engine retarder, the method comprising, during operation of the vehicle:
receiving, via an engine retarder demand input device of an operator interface of the vehicle, a request to increase engine retarder demand; and
in response to the request to increase engine retarder demand:
increasing an engine retarder demand setting; and
decreasing an auto-retarder set speed for the vehicle, wherein the auto-retarder set speed indicates a vehicle speed at which the engine retarder automatically activates to reduce the vehicle speed to the auto-retarder set speed, wherein the auto-retarder set speed differs from a cruise control set speed by a downhill-speed-control offset, and wherein decreasing the auto-retarder set speed comprises decreasing the downhill-speed-control offset.

2. The method of claim 1, wherein the engine retarder demand input device comprises a control stalk or a switch.

3. The method of claim 1, wherein the engine retarder demand input device comprises a steering-column-mounted control stalk, and wherein the operator input comprises moving the steering-column-mounted control stalk up or down.

4. The method of claim 1 further comprising:
receiving, via the engine retarder demand input device, a request to decrease engine retarder demand in the engine retarder of the vehicle; and
in response to the request to decrease engine retarder demand:
decreasing the engine retarder demand setting; and
increasing the auto-retarder set speed for the vehicle, wherein increasing the auto-retarder set speed comprises increasing the downhill-speed-control offset.

5. The method of claim 4, wherein the auto-retarder set speed is increased according to a predetermined slew rate.

6. The method of claim 1, wherein the auto-retarder set speed is decreased according to a predetermined slew rate.

7. The method of claim 1, wherein the engine retarder demand setting is selected from a group consisting of three or more demand settings.

8. The method of claim 1, wherein the downhill speed control offset is based on one or more of the vehicle speed or the cruise control set speed.

9. The method of claim 1, wherein the engine retarder demand setting and the auto-retarder set speed are stored by an on-board vehicle computer system.

10. A computer-implemented method of controlling downhill speed of a vehicle, the method comprising, during operation of the vehicle:
receiving a request to increase engine retarder demand; and
in response to the request to increase engine retarder demand:
increasing an engine retarder demand setting; and
if cruise control is active, decreasing a downhill-speed-control offset for the vehicle
in response to the vehicle speed exceeding an auto-retarder set speed, automatically activating the engine retarder, wherein the auto-retarder set speed differs from a cruise control set speed by a downhill-speed-control offset.

11. The method of claim 10, wherein the request to increase engine retarder demand is generated in response to operator input via an engine retarder demand input device of an operator interface of the vehicle.

12. The method of claim 11, wherein the engine retarder demand input device comprises a steering-column-mounted control stalk.

13. The method of claim 10 further comprising:
receiving a request to decrease engine retarder demand; and
in response to the request to decrease engine retarder demand:
decreasing the engine retarder demand setting; and
if cruise control is active, increasing the downhill-speed-control offset.

14. The method of claim 10, wherein the engine retarder demand setting is selected from a group consisting of three or more demand settings.

15. The method of claim 10, further comprising deactivating the engine retarder when the vehicle speed no longer exceeds the auto-retarder set speed.

16. The method of claim 10, wherein the auto-retarder set speed is stored in an on-board vehicle computer system.

17. A vehicle comprising:
an operator interface including an engine retarder demand input device; and
a vehicle computer comprising at least one processing unit and a memory having stored therein computer-executable instructions configured to cause the at least one processing unit to:
receive, via the engine retarder demand input device, a request to increase engine retarder demand; and
in response to the request to increase engine retarder demand:
increase an engine retarder demand setting; and
decrease an auto-retarder set speed for the vehicle, wherein the auto-retarder set speed indicates a vehicle speed at which an engine retarder automatically activates to reduce the vehicle speed to the auto-retarder set speed, wherein the auto-retarder set speed differs from a cruise control set speed by a downhill-speed-control offset, and wherein decreasing the auto-retarder set speed comprises decreasing the downhill-speed-control offset.

18. The vehicle of claim 17, wherein the engine retarder demand input device comprises a control stalk or a switch.

19. The vehicle of claim 17, wherein the computer-executable instructions are further configured to cause the at least one processing unit to:
receive, via the engine retarder demand input device, a request to decrease engine retarder demand; and
in response to the request to decrease engine retarder demand:
decrease the engine retarder demand setting; and
increase the auto-retarder set speed for the vehicle, wherein increasing the auto-retarder set speed comprises increasing the downhill-speed-control offset.

20. The vehicle of claim 17, wherein decreasing the downhill-speed-control offset comprises adjusting the offset value over a period of time according to a slew rate.

* * * * *